UNITED STATES PATENT OFFICE.

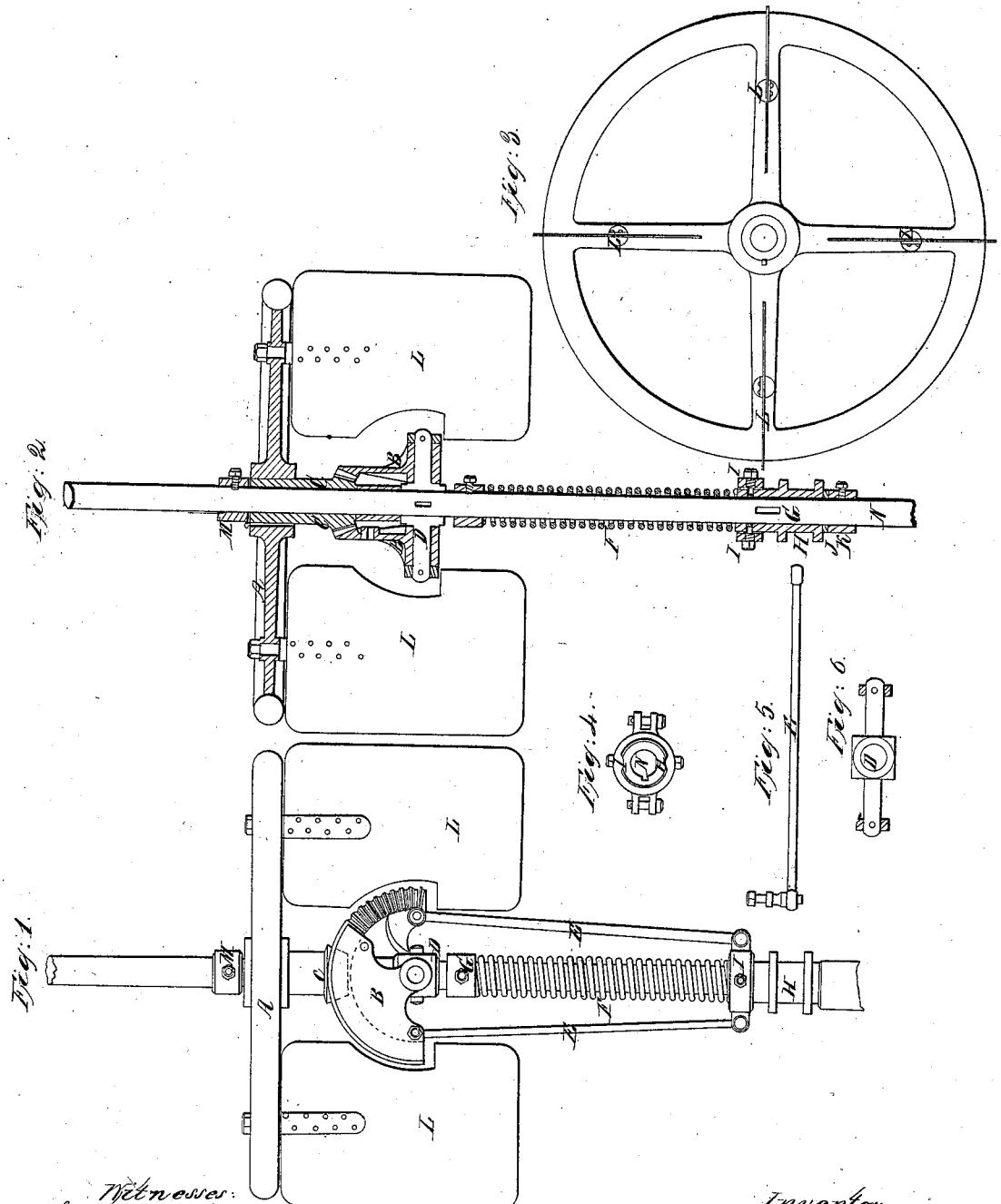

THOMAS SILVER, OF PHILADELPHIA, PENNSYLVANIA.

GOVERNOR FOR REGULATING THE SPEED OF STEAM-ENGINES.

Specification forming part of Letters Patent No. 23,790, dated April 26, 1859; Reissued July 25, 1865, No. 2,039.

*To all whom it may concern:*

Be it known that whereas I, THOMAS SILVER, of Philadelphia, and State of Pennsylvania, did invent and file, on February 14, 1857, a specification in the Patent Office of the United States of America for a new and Improved Method of Regulating the Speed of Steam-Engines, which was rejected April 17, 1857, and patented, or the principal features contained therein, in England, May 23, 1857, and having since made modifications in the details thereof I now withdraw the original specification and declare that the following is a full and exact description of this my new application, reference being had to the accompanying drawings and letters of reference marked thereon.

The nature of my invention, consists of a shaft or spindle, which, for the purposes of greater convenience, for communicating motion to it, from the main shaft, or other rotating portion, of a steam-engine, is usually placed in a horizontal position, on proper bearings, and driven by gearing, pulley, or any suitable means, said shaft, having upon it, and turning loosely in the center, a fly or momentum wheel, and at the center of which, is firmly fixed a toothed pinion, or boss. Near this toothed pinion or boss, is fixed upon, or through the aforesaid shaft or spindle, a cross head or bearing, which forms an axis, for two toothed wheels, or sectors, on opposite sides of the shaft or spindle, and gearing into the aforesaid toothed pinion, or boss, the movement of the toothed wheels, or sectors, being the one to the right, and the other to the left, when the momentum wheel, is turned upon the shaft, or spindle, in order to communicate, an up or down motion, from the aforesaid toothed wheels, or sectors, to a sliding sleeve upon the shaft, or spindle, cords, links, or connecting rods, connect the former with the latter.

In order to distend the sliding sleeve, to as great a distance as possible, from the cross-head that bears the toothed wheels, or sectors, a spiral spring, is fixed upon the shaft or spindle, between the two, which serves also, to cause the momentum or fly wheel, to rotate at a greater speed, than the shaft or spindle, that bears it, or rather, if the shaft or spindle, should commence to rotate, the momentum wheel is drawn after it, until it attains its proper relative speed, by force of the spring, the latter also serving to work the throttle valve.

In order to limit the speed, of the fly or momentum wheel as desired, there are affixed two or more vanes or fans, that can be adjusted to any angle, to suit the desired resistance to the atmosphere, and set with a nut, or set screw. Or, as the aforesaid spring naturally increases its force as it is compressed, and would have a tendency to impel the fly wheel more rapidly, the vanes may be fixed eccentrically, and have springs attached to them, that shall hold them partially, from the resistance of the atmosphere, but in a position at which they shall impinge the latter, to a greater degree, as the momentum wheel, should have a tendency to increase its speed, in short, acting reversely in principle, to that of a self regulating wind mill, in fact, a good governor may be constructed, on this principle alone, for the purpose of obtaining additional immediate power however, I prefer to add the momentum wheel, in order to get the benefit of its weight, or inertia, to assist in the overcoming of the friction, or hesitancy of the throttle-valve, and other connected parts to move, but when used for marine engines, the self regulating arrangement, of the vanes, to correspond with the increased tension of the spring, is unnecessary, as I substituted it, by attaching the lifting links to the side sectors, or bevel wheels, in such a position, that as the latter turns upward, the connecting points, are drawn partially over their axis of motion, thereby obtaining a leverage force over the spring, in comparison, or sufficiently so for practical purpose, as it increases its tension by compression, but if thought more desirable, the side wheels or sectors, may be fixed eccentrically, with their teeth working in a long straight pinion.

In the place of vanes being fixed upon the fly wheel, to limit its speed, a friction roller may rest upon its periphery, the axis of which, may bear vanes, and also additional small fly wheels, if needed to retard its speed.

The aforesaid sliding sleeve, has in its lower end a slot, in which the fork of a lever or rock shaft works, and communicates motion to the throttle valve, in the ordinary manner of governors.

To enable others, to construct and apply my invention, I proceed to describe its plans &c.

Figure 1, of the annexed drawing, is a view of a completed instrument, without driving gearing. Fig. 2 is a sectional view of the same. Fig. 3, is a view of the flywheel, letters of reference on Fig. 1, and Fig. 2 meaning the same.

A, the fly or momentum wheel. B, toothed wheels or sectors. C, boss, or toothed pinion. D, cross head upon or through, the shaft or spindle. E, E, connecting links or cords. F, the spring. G, a collar by which the spring, may be compressed and maintained, by a set screw. H, the sliding sleeve. I, crosshead, which surrounds the upper end of the sliding sleeve, and rests upon pins, that it may vibrate, to accommodate any variation in the action, of the toothed wheels or sectors. K, a fixed collar for the sliding sleeve, to drop against. L, vanes or fans. M, a collar to hold the fly wheel in its position. N, shaft or spindle.

Fig. 4, is a sectional view of the crosshead N. Fig. 5 connecting links and stud. Fig. 6 sectional view of crosshead that bears the toothed wheels or sectors.

It will now be seen, that when the instrument is in action, that while the shaft or spindle, and momentum wheel, rotate with the same velocity, the sliding sleeve will remain distended to the collar K, but upon the shaft, being impelled by the increased speed of an engine, with a greater rapidity than the momentum wheel, and carrying therewith the toothed wheels or sectors, the latter, impinging upon the toothed boss, or pinion, are turned, the one to the right, and the other to the left, drawing the collar H, toward them, and compressing the spring, and closing the throttle-valve, or on the other hand, should the engine slack its speed, the momentum wheel, with the aid of the spring, maintains its velocity, and thereby draws the throttle valve open.

Having now fully described my invention, what I claim in its arrangements, as a novelty, and desire to secure by Letters Patent, is—

The combination of a spring, with a momentum wheel, and adjustable speed limiting vanes, the whole constructed, with the combination of the peculiarly adjusted sectors, pinion, and links, as fully described and set forth.

THOMAS SILVER.

Witnesses:
R. W. BENSON,
P. JANNEY.